United States Patent
Schlegelmilch et al.

(10) Patent No.: US 11,354,003 B2
(45) Date of Patent: Jun. 7, 2022

(54) ARRANGEMENT FOR SPATIALLY RESOLVING PROJECTED-CAPACITIVE TOUCH DETECTION WITH IMPROVED LOCALLY DEFORMED ELECTRODE STRUCTURE

(71) Applicant: PREH GMBH, Bad Neustadt A.D. Saale (DE)

(72) Inventors: Rainer Schlegelmilch, Muennerstadt (DE); Jochen Schlereth, Sondheim/Rhoen (DE)

(73) Assignee: PREH GMBH, Bad Neustadt A.D. Saale (DE)

( * ) Notice: Subject to any disclaimer, the term of this patent is extended or adjusted under 35 U.S.C. 154(b) by 0 days.

(21) Appl. No.: 17/158,015

(22) Filed: Jan. 26, 2021

(65) Prior Publication Data

US 2021/0149526 A1    May 20, 2021

Related U.S. Application Data

(63) Continuation of application No. 15/562,592, filed as application No. PCT/EP2016/056865 on Mar. 30, 2016, now abandoned.

(30) Foreign Application Priority Data

Apr. 21, 2015    (DE) ...................... 10 2015 106 101.5

(51) Int. Cl.
    *G06F 3/044*    (2006.01)
(52) U.S. Cl.
    CPC .......... *G06F 3/0446* (2019.05); *G06F 3/0448* (2019.05); *G06F 2203/04112* (2013.01)
(58) Field of Classification Search
    CPC .................. G06F 3/0446; G06F 3/0448; G06F 2203/04112
    See application file for complete search history.

(56) References Cited

U.S. PATENT DOCUMENTS 6,429,840 B1 *  8/2002  Sekiguchi ............. G06F 3/0445
                                                        345/87
2006/0274050 A1    12/2006  Lii
(Continued)

FOREIGN PATENT DOCUMENTS

CN    102789345 A    11/2012
CN    104461185 A     3/2015
(Continued)

OTHER PUBLICATIONS

The First Office Action for Chinese Patent Application No. 2016800213128, dated Nov. 4, 2019, CNIPA, China.

*Primary Examiner* — Hang Lin
(74) *Attorney, Agent, or Firm* — Norman B. Thot (57) ABSTRACT

A device for spatially resolving a projected capacitive touch detection. The device includes an electrically insulating substrate with a first and a second type of electrically conductive surfaces, and a through-hole. The first type of electrically conductive surfaces are connected in rows to form transmitting electrodes. The second type of electrically conductive surfaces are connected in columns to form receiving electrodes. The first type of electrically conductive surfaces includes non-deformed first type of electrically conductive surfaces and deformed first type of electrically conductive surface(s). The second type of electrically conductive surfaces includes non-deformed second type of electrically conductive surfaces and deformed second type of electrically conductive surface(s). The first type of electrically conductive surfaces and the second type of electrically conductive surfaces are arranged in an alternating manner. The deformed first and/or second type of electrically conductive surface(s) abut the through-hole.

15 Claims, 6 Drawing Sheets

(56) References Cited

U.S. PATENT DOCUMENTS

2015/0075960 A1* 3/2015 Hsieh .................. H03K 17/962
                                                          200/600
2016/0139702 A1* 5/2016 Franklin ................. H04R 5/04
                                                          345/174

FOREIGN PATENT DOCUMENTS

DE       102010045194 A1    4/2011
JP          2011060170 A    3/2011

* cited by examiner

ARRANGEMENT FOR SPATIALLY RESOLVING PROJECTED-CAPACITIVE TOUCH DETECTION WITH IMPROVED LOCALLY DEFORMED ELECTRODE STRUCTURE

CROSS REFERENCE TO PRIOR APPLICATIONS

This application is a continuation of application Ser. No. 15/562,592, filed on Sep. 28, 2017, which is a U.S. National Phase application under 35 U.S.C. § 371 of International Application No. PCT/EP2016/056865, filed Mar. 30, 2016, and which claims benefit to the German Application No. 10 2015 106 101.5, filed Apr. 21, 2015, the contents of which are hereby incorporated by reference. The International Application was published in German on Oct. 27, 2016 as WO 2016/169738 A1 under PCT Article 21(2).

FIELD

The present disclosure relates generally to an assembly for the spatially resolving projected capacitive touch detection, in particular to a touchpad with projected capacitive technology.

BACKGROUND

Projected capacitive technology (pcap touch) has rapidly developed into one of the most important touch technologies for more and more applications, from consumer devices to commercial applications in the automobile sector. Since touch-capable device are used by more and more users, consumers and experts are already no longer content with simple single-touch functionality and instead expect touch-sensitive applications with multi-touch and multi-user capabilities.

Projected capacitive technology (pcap touch) recognizes touches by measuring the electrical capacitance on each addressable electrode. If a finger or conductive pen approaches an electrode, its electromagnetic field is disturbed and its electrical capacitance changed. This change can be measured by the electronics and converted into X-Y-coordinates, which can then be used for touch recognition by the system. The methods for touch recognition are divided into two main types, which are referred to as self capacitance and mutual capacitance.

The first touch recognition method is based on self capacitance. In this case, the electronics measure the current present on each electrode in relation to the ground level. There are two options for touch recognition, wherein the electrodes may either be arranged as a multi pad or in lines and columns. In the case of the multi pad design, each electrode, or each "pad", can be individually addressed by the electronics, which is why an individual connection between the electrode and the controller is required. For this reason, a multi-touch control process is possible in self capacitance systems with a multi pad, but since each pad has to be addressed individually, the implementation is very difficult for touchpads with a diagonal of more than 3.5 inches. In the case of an arrangement in lines and columns, each line and each column constitutes an electrode and is individually addressed by the evaluation unit. Though the point of intersection of a line and a column represents a unique coordinate pair, the evaluation unit is capable of acquiring only individual electrodes, but not each individual point of intersection. Therefore, these systems are limited to single and dual touch recognition, with so-called "ghost points" possibly posing a problem. The latter are the result of imaginary or false points of intersection at points that do not correspond to the touching point.

Mutual capacitance is understood to be the intended or unintended electrical capacitance between two charged items. In the case of projected capacitive touchpads (pcap touch), a mutual capacitance is deliberately established between the elements of the lines and columns located in the vicinity of the individual points of intersection. In this way, the system electronics are able to measure each node (point of intersection) individually and thus acquire several touches on the touchpad with a single scanning process.

If the touchpad is touched close to a point of intersection, a part of the mutual capacitance between the line and the column is coupled to the finger, and the electrical capacitance of the point of intersection measured by the evaluation unit is reduced. The reduced electrical capacitance exceeds the "touch threshold" set by the evaluation unit and signals to the system that a touch has occurred.

As a rule, the electrode structure, which is provided for touch detection and disposed in rows and columns, is characterized by an alternating, strictly regular pattern of electrode surfaces, which are usually referred to as "pads", and hereinafter also, in short, as "surfaces". The density of the assembly determines the resolving power. For example, the surfaces are rhombic, snowflake-shaped, triangular or round, wherein the shape or outer circumference of the surfaces of the electrodes connected in rows usually, but not necessarily, differs from the shape or outer circumference of the electrodes connected in columns. Local geometric deviations from the regular pattern usually result in a disturbance of the resolving power at the respective local point and are therefore avoided. Because, as a rule, the electrode structure is provided directly behind a layer forming the touch surface, if possible, through-holes passing through the electrode structure and its substrate for fastening means or orientation aids or symbols that can be backlit, particularly in the case of a substrate through which light cannot be transmitted, are only disposed outside the touch surface in order not to affect the resolving power. Thus, the design variety is limited, the required construction space is increased, symbols or orientation aids are not placed in an optimum manner with respect to the operational design.

SUMMARY

An aspect of the present invention is to compensate for geometric deviations from the strictly regular pattern, in particular through-holes through the electrode structure, in order to still obtain a resolving power of the touch detection which comes close to the strictly regular pattern, in order to create a user-friendly, space-saving and clearly structured operating surface for use in motor vehicles.

In an embodiment, the present invention provides a device for spatially resolving a projected capacitive touch detection. The device includes an electrically insulating substrate comprising a first type of electrically conductive surfaces, a second type of electrically conductive surfaces, and a through-hole. The first type of electrically conductive surfaces are electrically connected to each another in rows so as to form a plurality of transmitting electrodes. The second type of electrically conductive surfaces are electrically connected to each other in columns so as to form a plurality of receiving electrodes. The first type of electrically conductive surfaces comprise non-deformed first type of electrically conductive surfaces having an outer circumference having a rectilinear profile and at least one deformed first type of electrically conductive surface having an outer circumference which has a stretched profile or a contracted profile compared to the outer circumference of the non-deformed first type of electrically conductive surfaces. The second type of electrically conductive surfaces comprise non-deformed second type of electrically conductive surfaces having an outer circumference having a rectilinear profile and at least one deformed second type of electrically conductive surface having an outer circumference which has a stretched profile or a contracted profile compared to the outer circumference of the non-deformed first type of electrically conductive surfaces. The first type of electrically conductive surfaces and the second type of electrically conductive surfaces are arranged in an alternating manner where a closest outer circumference of each of the first type of electrically conductive surfaces is always one of the second type of electrically conductive surfaces, and a closest outer circumference of each of the second type of electrically conductive surfaces is always one of the first type of electrically conductive surfaces. A minimum distance always exists between each of the first type of electrically conductive surfaces and each of the second type of electrically conductive surfaces. At least one of the at least one deformed first type of electrically conductive surface and at least one of the at least one deformed second type of electrically conductive surface are respectively arranged to directly abut an outer circumference of the through-hole.

BRIEF DESCRIPTION OF THE DRAWINGS

The present invention is described in greater detail below on the basis of embodiments and of the drawings in which.

DETAILED DESCRIPTION

The assembly for the spatially resolving projected capacitive touch detection according to the present disclosure comprises an electrically insulating substrate (hereinafter only referred to as substrate), with several electrically conductive, for example metallic, surfaces of a first type and a second type disposed side-by-side on the substrate. Within one type, the surfaces have a regular, uniform surface configuration; for example, the surfaces are rhombic, triangular, snowflake-shaped or round. In particular, the geometric shapes of the surfaces are configured in such a way that the density of the surfaces is optimized with respect to the intended resolving power of the touch detection. Surfaces having a regular, uniform surface configuration corresponding to the respective type are referred to as type-related.

The surfaces of the first type are preferably electrically connected to one another in rows in order to form several transmitting electrodes. The surfaces of the second type are electrically connected to one another in columns in order to form several receiving electrodes. Wherein the terms in columns and in rows only serve for the functional differentiation of the surface types and are not to be understood to be limiting as regards the spatial orientation.

The surfaces of the first and second types are disposed in a type-alternating manner. In this case, the term alternating is to be understood to mean that the surfaces closest in space to a surface of one type are surfaces of the respective other type, and the next-but-one surfaces are surfaces of the respective same type. A substantially regular pattern is formed by this type-alternating arrangement, so that the surface of the one type is surrounded by several surfaces of the other type, in each case maintaining a minimum distance. In this case, the minimum distance is to be understood to mean the minimum distance between the respective next long side of the adjacent surfaces of the first and second types. According to one embodiment, the distance is kept constant across opposite flanks of the most closely adjacent surfaces. A pattern in which the distance between the geometric center points of the placed surfaces of the first and second types remains constant over the extension range of the pattern, for example, is considered a regular pattern. Surfaces that are arranged in accordance with the regular patterns are configured in a rule-compliant manner.

According to the present disclosure, a through-hole is formed in the electrically insulating substrate, wherein at least one first surface of the first or the second type adjacent to the through-hole is provided, which, with respect to its type-related surface configuration and/or type-related positioning, is configured in a non-rule-compliant manner, wherein the predefined minimum distance from at least two most closely adjacent surfaces of the other type is obtained. For example, an arrangement in which the distance between the surfaces, which is otherwise identical in a type-related, rule-compliant manner in the remaining pattern, is not maintained with regard to this surface, is considered a non-type-conformable, rule-compliant positioning. For example, a substantial, possibly exclusive, deviation in the respective surface from the type-related, rule-compliant surfaces of the remaining regular pattern is considered a non-type-related rule-compliant surface configuration. For example, surfaces of the first and second types may be deformed, i.e. stretched or contracted in the direction of the columns and/or rows, wherein the deformation relates to the outer circumference of the surface. Generally, deviations within surfaces that are otherwise rule-compliant with regard to their outer circumference are not considered a deformed and thus non-rule-compliant surface configuration. In addition, in a non-rule-compliant surface configuration, the positioning of the deformed surface may also deviate from the position corresponding to the regular pattern. By arranging the surfaces in a non-rule-compliant manner, it is accomplished, in particular, that the respective electrode is routed around the through-hole and that thus, the sensitivity and associated spatial resolution is maintained despite the through-hole. This has the effect, according to the present disclosure, that the resolving power of the touch detection is maintained or almost maintained in the area of the through-hole, despite the non-rule-compliant surface configuration.

According to an embodiment, at least one of the two surfaces of the other type, which are most closely adjacent to the non-rule-compliant first surface, is also configured in a non-rule-compliant manner with respect to its type-related surface configuration. An improved approximation of the touching point resolving power of the regular pattern can be achieved by this advantageous embodiment according to the present disclosure, due to the fact that the minimum distance between the non-rule-compliant surfaces is maintained.

Preferably, at least one second surface of the same type adjacent to an opposite side of the through-hole is configured in a non-rule-compliant manner in the direction of the first surface.

Preferably, the non-rule-compliant surface, with regard to its outer circumference, is not congruent in some areas with the outer circumference of a corresponding rule-compliant surface of the same type.

According to an embodiment, the outer circumference of the through-hole substantially corresponds to the outer circumference of a symbol, for example of a letter, a digit or an arrow, or even a combination of several letters, or a combination of at least one letter with at least one digit. However, the through-hole may also correspond to the shape of a fastening device or of an alternative operating member, such as, for example, a switch knob.

The through-hole, in the direction orthogonal to the extending direction of the columns or rows, has a maximum clearance which is in the range of 0.2 to 2 times, for example, 0.5 to 1.5 times, the distance between the columns or the distance between the rows of the regular pattern. At the same time, the through-hole may have an extent exceeding the above-stated range in the remaining perpendicular direction of the direction of the column or the direction of the row; thus, for example, 3 to 5 times the distance between the columns is possible if the distance between the rows is within the range defined above.

Preferably, the non-rule-compliant surface is smaller than the rule-compliant surface of the same type. Possible effects of the smaller surface on the touch sensitivity are compensated, for example, also by the evaluation process provided in the evaluation unit. The compensation, which is preferably software-based, is in this case carried out depending on the loss of resolving power of the touch detection to be compensated; in particular, the method used for the software-based compensation is determined by the geometry of the through-hole.

According to an embodiment, the geometric center point of the through-hole is disposed within a column and/or row defined by the regular pattern. The through-hole thus characterized, in particular in the case of through-holes in the above-defined preferred range, reduces the number of deformed surfaces, so that the loss of resolving power of the touch detection to be compensated is smaller, and a constant sensitivity in the area of the through-hole can be obtained.

The surfaces of the first and second types may be disposed in a coplanar manner on the substrate or, with respect to their affiliation with a type, on different sides or layers of the substrate.

For example, the substrate is an opaque substrate. In one example, the substrate is a circuit board.

An embodiment of the assembly has an electrical conductor disposed on an additional layer of the substrate for electrically connecting, in a manner bypassing the through-hole, one of the non-rule-compliant surfaces to at least one further surface of the transmitting electrode or of the receiving electrode; among other things, this enables the realization of larger through-holes which cannot be bypassed by a non-rule-compliant surface configuration.

In an embodiment, the assembly further comprises a surface structure disposed over the substrate and defining an input surface, which is configured in an at least translucent manner in the area adjacent to the through-hole, and wherein a lighting means for transmitting light through the through-hole is provided underneath the substrate. In particular, a user-friendly operating surface equipped with orientation aids can be designed by the integration of lighting means according to the present disclosure. In addition, the orientation aids can be placed on the operating surface in an optimum manner due to the assembly according to the present disclosure. In addition, a compact construction of the operating member can be achieved. A user-friendly, in particular clearly structured, space-saving operating member is extremely advantageous particularly for use in a vehicle. For example, this advantage of the present disclosure is also the result of the concentration of the driver not being disrupted by a confusing operating member.

In another embodiment, the through-hole is used for passing a fastening means of the surface structure through the substrate.

The assembly can be equipped with an electrical evaluation unit electrically connected to the transmitting electrodes. The evaluation unit may be disposed on the rear side of the substrate facing away from the surface structure, whereas the electrically conductive surfaces of the first and second types are located on the front side of the substrate facing towards the surface structure.

According to the present disclosure, the evaluation unit is configured for detecting a touch by means of the transmitting and receiving electrodes in accordance with the mutual capacitance principle. In particular, the mutual capacitance principle is advantageous in that a simultaneous multiple touch (multi touch) is can be detected as a specific input.

The evaluation unit is configured to amplify the measured signal between a receiving electrode and a transmitting electrode, in which at least one of the electrode surfaces in the intersecting area of the two electrodes is a deformed surface, by a predefined gain factor. In particular, the gain factor is in this case designed such that the loss of the resolving power of the touch detection is compensated.

The resolving power of the touch detection can also be further increased by using software-based methods in the area of the through-hole. For example, capacitance losses produced by software-based gain factors may thus be compensated. In particular in the case of small through-holes, a Gaussian filter, in analogy to blur tools in image processing, may compensate a possible loss of resolving power of the touch detection in the area of the through-holes. A software-based compensation of through-holes with different geometries in an assembly according to the present disclosure may also be carried out by means of a combination of different software-based methods in accordance with the geometry of the through-hole.

The assembly according to the present disclosure is, for example, provided for use in a motor vehicle.

The present disclosure is explained in greater detail below under reference to the drawings. The drawings are thereby to be understood only as examples and merely represent an example embodiment.

DETAILED DESCRIPTION

Figure 1:
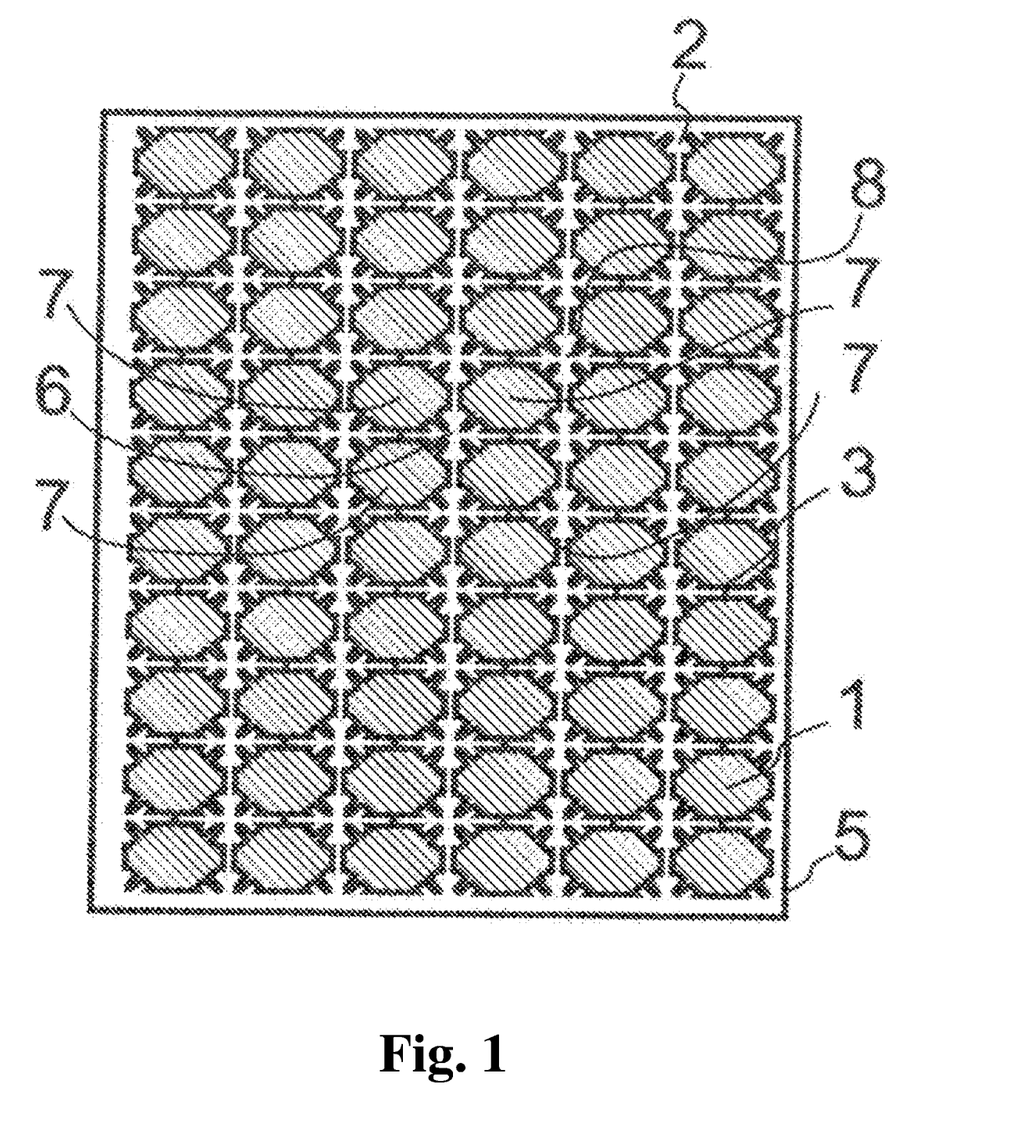
FIG. 1 shows an embodiment of a type-related rule-compliant assembly with snow-flake-shaped surfaces of a first type.
Figure 2:
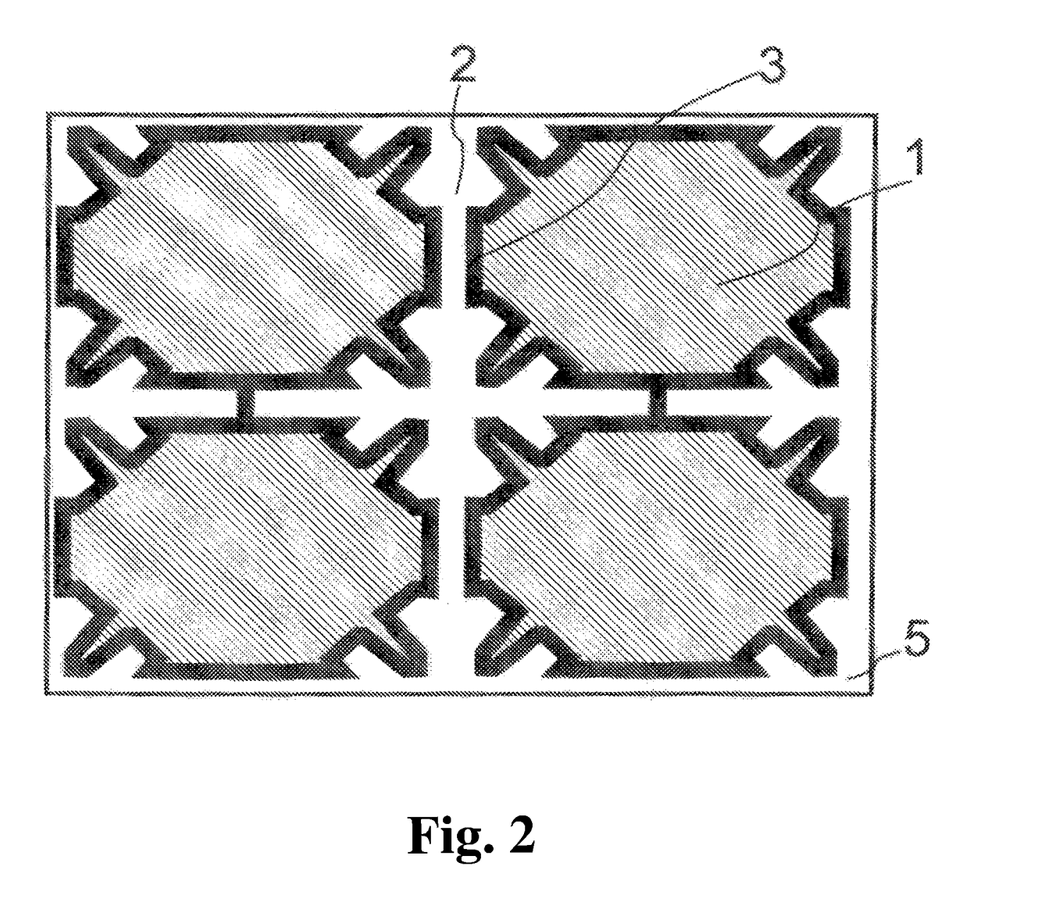
FIG. 2 shows an enlarged section of FIG. 1.

FIG. 1 shows an embodiment of snowflake-shaped surfaces of the second type 2 and the surfaces of the first type 1 interwoven with the snowflake-shaped surfaces for the spatially resolving projected capacitive touch detection on an electrically insulating substrate 5. The surfaces of the first type 1 and second type 2 shown are disposed in a rule-compliant manner. In this embodiment, the surfaces of the first type 1 and second type 2 differ with regard to their size and shape. For example, the surfaces of the first type 1 are larger than the surfaces of the second type 2; in addition, the surfaces of the first type 1 are interwoven with the surfaces of the second type 2, so that, for example, a surface 6 of the second type 2 is predefined by, in each case, four closest surfaces 7 of the first type 1. The surfaces of the first type 1 are disposed on a deeper layer of the substrate 5 below the surfaces of the second type 2; the connection 11 in rows between the surfaces of the first type 1 is emphasized by a hatched area. The surfaces of the first type 1 disposed in this manner form a total of ten transmitting electrodes 15. The surfaces of the second type 2 are connected to one another in columns and form a total of six receiving electrodes 14. For projected capacitive touch detection, an electrical field or a capacitance is established between the surfaces of the first type 1 and second type 2. The surfaces of the first type 1 and second type 2 shown here are configured in such a way that the common boundary surface 12 is of maximum size. The capacitance between the surfaces, electrodes, of the first type 1 and the second type 2 is maximized by a maximized boundary surface 12 between the surfaces, electrodes, of the first type 1 and the second type 2. In addition, the distance of the surfaces of the first type 1 and the second type 2 in the regular pattern 13 shown here is a minimum distance 3. Due to the interwoven configuration of the surfaces of the first type 1 with the surfaces of the second type 2, the charge-carrying surfaces achieve a maximum coverage of the surface area available on the substrate 5. Generally, the capacitance is inversely proportional to the distance between the charge-carrying surfaces, electrodes, of the first type 1 and the second type 2. Since the distance between the surfaces is a minimum distance 3, the capacitance is maximized in relation to the distance. In the embodiment illustrated in FIGS. 1-4, the minimum distance 3 is depicted by a black line. At the same time, the black line also marks the common boundary surface 12. The minimum distance 3 can be seen particularly clearly in the schematic detailed view of FIG. 2.

Figure 3:
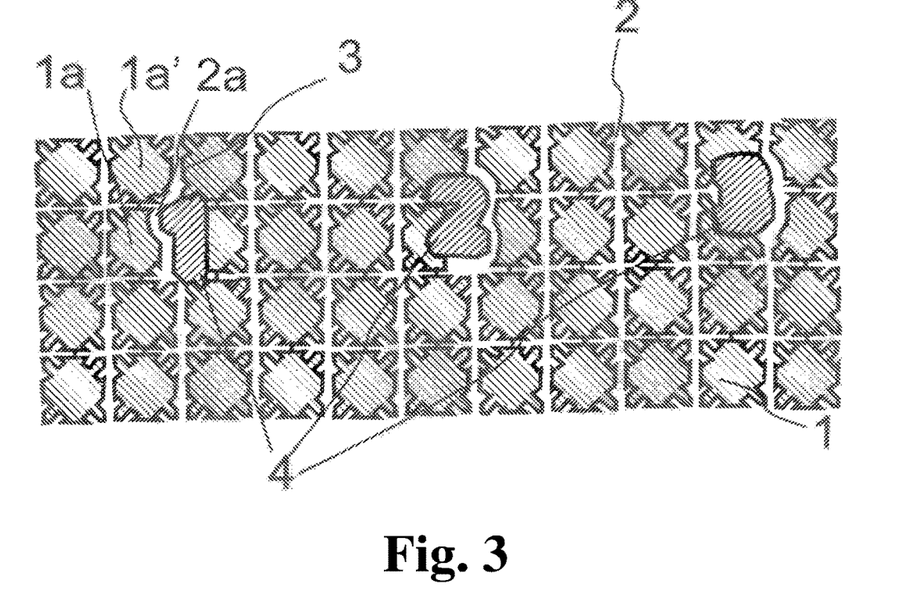
FIG. 3 shows a schematic detailed view of an assembly according to the embodiment shown in FIG. 1 in the vicinity of a smaller through-hole.

FIG. 3 shows a schematic detailed view of an assembly with a partially non-rule-compliant snowflake-shaped surface configuration of the second type 2 and corresponding surfaces of the first type 1 in the vicinity of a through-hole 4. The through-holes 4 shown here have a maximum clearance and have the shape of the digits 1, 2 or 3. The respective through-hole 4 has about 1 times the size of the distance between the columns or rows of the regular pattern 13. Surfaces of the second type 2a are provided adjacent to the through-hole, which, with respect to their type-related surface configuration, are configured in a non-rule-compliant manner, wherein the predefined minimum distance 3 from three most closely adjacent surfaces of the other type is obtained. It can be seen that all three (1a, 1a', 1a") surfaces most closely adjacent to the non-rule-compliant first surface 2a are also configured in a non-rule-compliant manner with respect to their surface configuration. The non-rule-compliant configuration of the most closely adjacent surfaces makes it possible, for example, to maintain the minimum distance 3, to maximize the common boundary surfaces between the respective surface 1a, 1a' or 1a" and the surface 2a, and/or to enlarge the charge-carrying surface. Thus, for example, the capacitance between the surface 2a directly adjacent to the through-hole 4 and the respective surface 1a, 1a' or 1a" changes relative to the changed common boundary surface 12 and the charge quantity on the charge-carrying surface, but not relative to the minimum distance 3.

Compared to the common boundary surface 12 of the rule-compliant surfaces (FIG. 1 and FIG. 2), the common boundary surface 12 of the non-rule-compliant surfaces is reduced. In order to minimize the reduction of the common boundary surface 12 of the non-rule-compliant surfaces of the first type 1 and the second type 2, the surfaces are deformed from a previously rectilinear profile into a curved profile. From the perspective of the through-hole 4, the curved profile is, for example, curved convexly; for example, the center of curvature 9 is situated within the through-hole 4. For example, the loss of capacitance produced by the reduction of the common boundary surface can be compensated by the enlargement of the charge-carrying surface. It should be noted that the reduction of the common boundary surface may be different between the respective non-rule-compliant surfaces. For example, the common boundary surface of the surfaces 1a' and 2a is larger than the common boundary surface of the surfaces 1a and 2a. At the same time, for example, the charge-carrying surface 2a in the area of the common boundary surface 1a' to 2a is smaller than the charge-carrying surface 2a in the area of the common boundary surface 1a to 2a. By maximizing the common boundary surfaces 12, taking into account the size of the charge-carrying surface and thus the charge quantity, the capacitance loss produced by the deviation from the regular pattern 13 is thus minimized. In addition, this minimized capacitance loss can be compensated in a software-based manner, for example. In addition, the capacitance loss on the non-rule-compliant surfaces can be compensated by, for example, a software-based gain factor in the evaluation unit not shown in the Figures, for example, in accordance with the reduced common boundary surface 12, taking into account the charge quantity corresponding to the charge-carrying surface.

Furthermore, for example, the capacitance can be increased, in the vicinity of the through-hole 4, by enlarging the common boundary surface 12 and the charge quantity corresponding to the charge-carrying surface, between the surface 1b and 2b and 1b and 2b'. For example, such an increase of the capacitance causes the sensitivity of the touch detection on the corresponding boundary surface to be increased. This may compensate the missing common boundary surface between the surfaces 2a and 1b, and thus the missing capacitance, for example.

Figure 4:
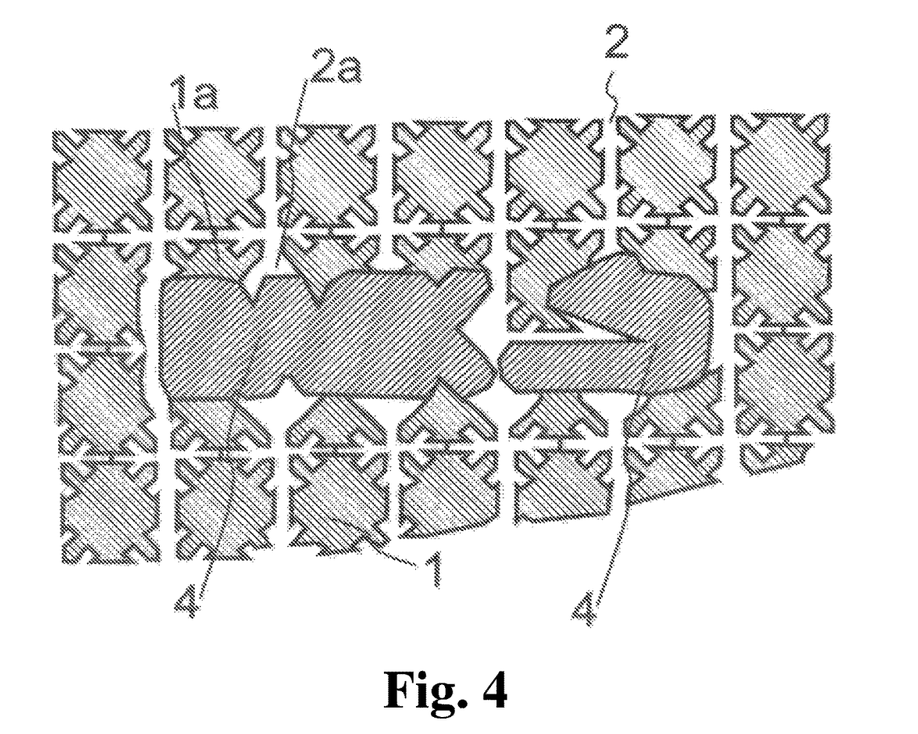
FIG. 4 shows a schematic detailed view of an assembly according to the embodiment shown in FIG. 1 in the vicinity of a larger through-hole.

FIG. 4 shows a schematic detailed view of an assembly with a partially non-rule-compliant snowflake-shaped surface configuration of the second type 2 and corresponding surfaces of the first type 1 in the vicinity of a through-hole 4. The through-holes 4 shown here have a maximum clearance and correspond to a combination of letters forming the word "Back" and a bent arrow. The respective through-hole 4 has approximately 1 times the size of the distance between the rows of the regular pattern 13, but about 5 times the size of the distance between the columns on the whole. Surfaces of the first type 1b or of the second type 2a are provided adjacent to the through-hole 4, which, with respect to their type-related surface configuration, are configured in a non-rule-compliant manner, wherein the predefined minimum distance 3 from in each case at least two most closely adjacent surfaces (1a, 1a') of the other type is obtained. In the case of the through-hole 4 shown here, it is not possible to connect all of the receiving electrodes 14 by a non-rule-compliant surface configuration with the respective receiving electrodes 14 separated by the through-hole 4; therefore, the respective receiving electrodes 14 were electrically connected to each other by means of a shielded layer of the circuit board. The center line 11 of the larger through-hole 4 shown here approximately lies on the connecting line between the geometric center points of the surfaces of the second type 2. Through the larger through-hole 4 positioned in this manner, the surfaces of the first type 1 can be connected to each other by means of a non-rule-compliant configuration; in addition, only the surface sides facing towards the larger through-hole 4 must thus be deformed.

Figure 5:
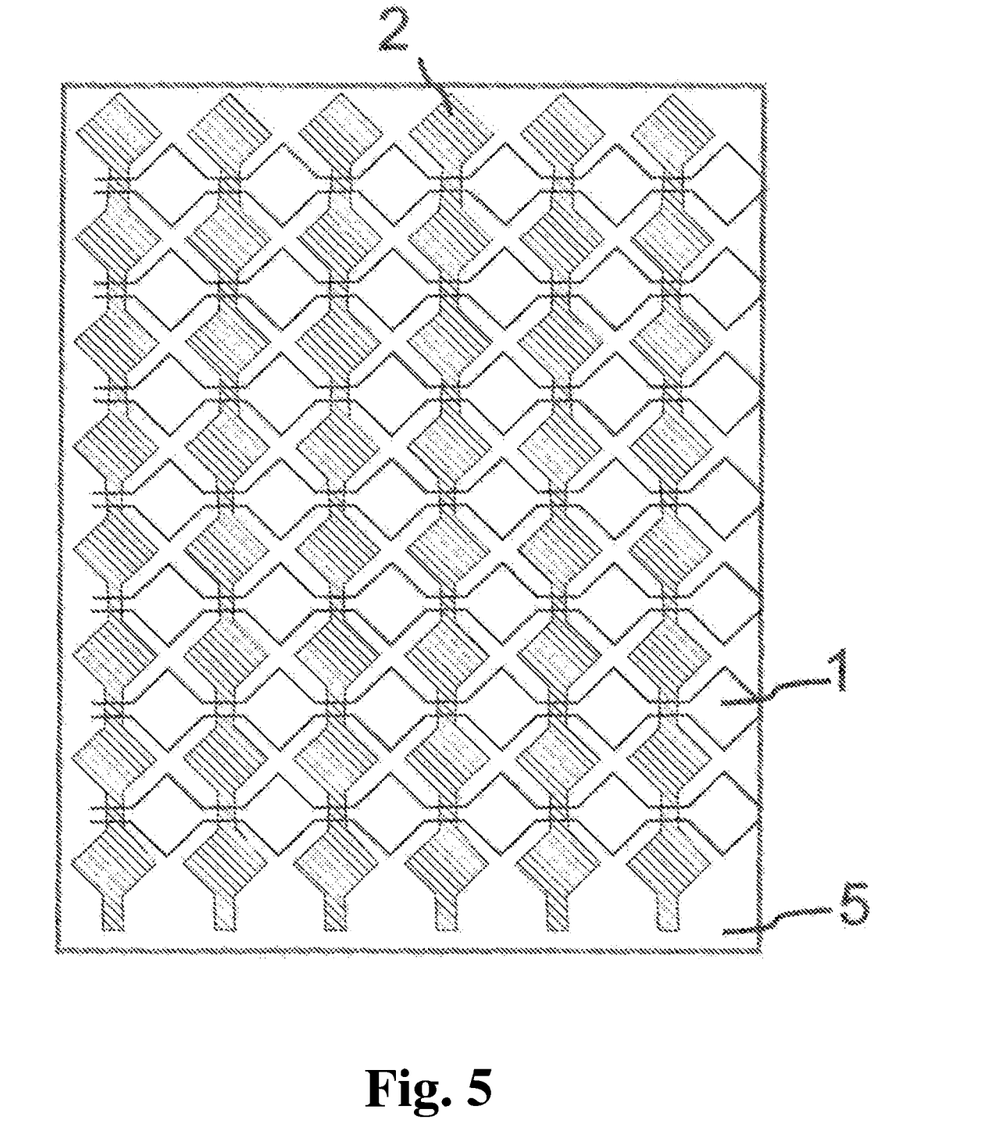
FIG. 5 shows an embodiment of a type-related rule-compliant assembly with rhombic surfaces.
Figure 6:
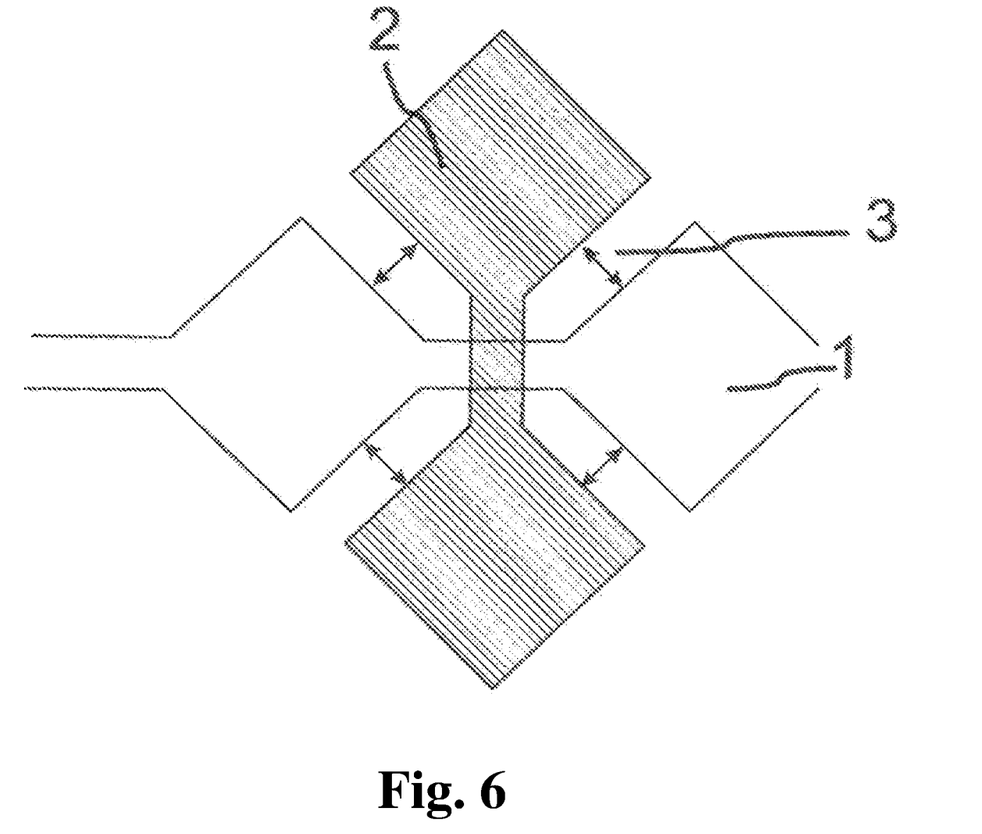
FIG. 6 shows an enlarged section of FIG. 5.

FIG. 5 shows an embodiment of rhombic surfaces for the spatially resolving projected capacitive touch detection on an electrically insulating substrate 5. The rhombic surfaces shown are rule-compliant and disposed in a type-alternating manner. Thus, the surfaces of the first type 1 are electrically connected to one another in rows in order to form several transmitting electrodes 15, and the surfaces of the second type 2 are electrically connected to one another in columns in order to form several receiving electrodes 14. A substantially regular pattern 13 is formed by this type-alternating arrangement. In this case, the minimum distance 3 is to be understood to mean the distance between the respective next long side of the adjacent surfaces of the first type 1 and the second type 2. In FIG. 6, the minimum distance 3 is illustrated by distance arrows. In the rule-compliant assembly shown in FIGS. 5 and 6, both the minimum distance 3 between all surfaces and the distance between the geometric center points of the respective surfaces are maintained. In addition, the surfaces of the first type 1 and second type 2 are not deformed. In this embodiment, the surfaces of the first type 1 and the second type 2 do not differ with respect to their size and shape. The surfaces of the first type 1 are disposed on a deeper layer of the substrate 5 below the surfaces of the second type 2.

Figure 7:
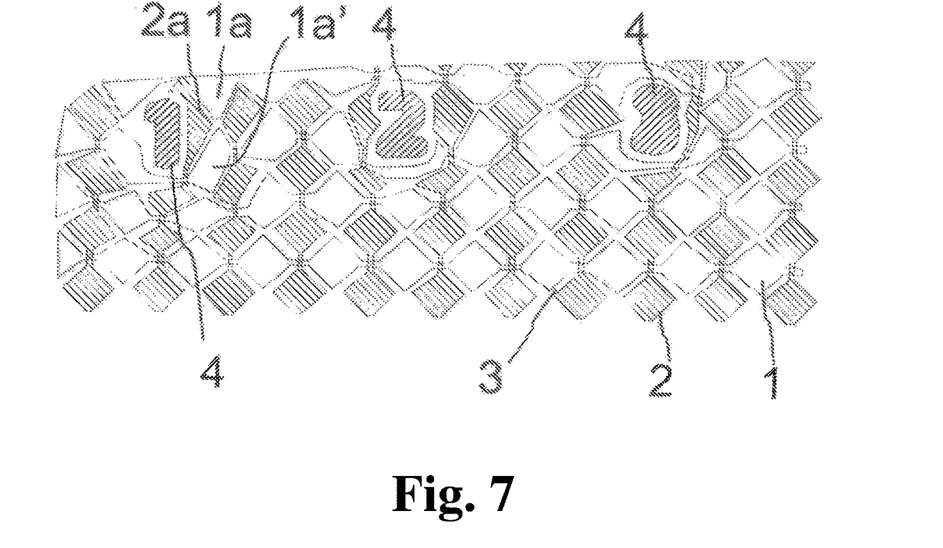
FIG. 7 shows a schematic detailed view of an assembly according to the embodiment shown in FIG. 5 in the vicinity of a smaller through-hole.

FIG. 7 shows a schematic detailed view, an assembly with a partially non-rule-compliant rhombic surface configuration of the first type 1 and second type 2 in the vicinity of a through-hole 4. The through-holes 4 shown here have a maximum clearance and have the shape of the digits 1, 2 or 3. The respective through-hole 4 has about 1 times the size of the distance between the columns or rows of the regular pattern 13. Surfaces of the first type 1b or of the second type 2a are provided adjacent to the through-hole 4, which, with respect to their type-related surface configuration, are configured in a non-rule-compliant manner, wherein the predefined minimum distance 3 from in each case at least two most closely adjacent surfaces of the other type is obtained. In particular, it can be seen that at least one 1a of the two (1a, 1a') surfaces of the other type, which are most closely adjacent to the non-rule-compliant first surface 2a, is also configured in a non-rule-compliant manner with respect to its type-related surface configuration. Express reference is made to the fact that any possible deviations from the rule that the predefined minimum distance from, in each case, two most closely adjacent surfaces of the other type is obtained, result from inaccuracies in the drawings.

Figure 8:
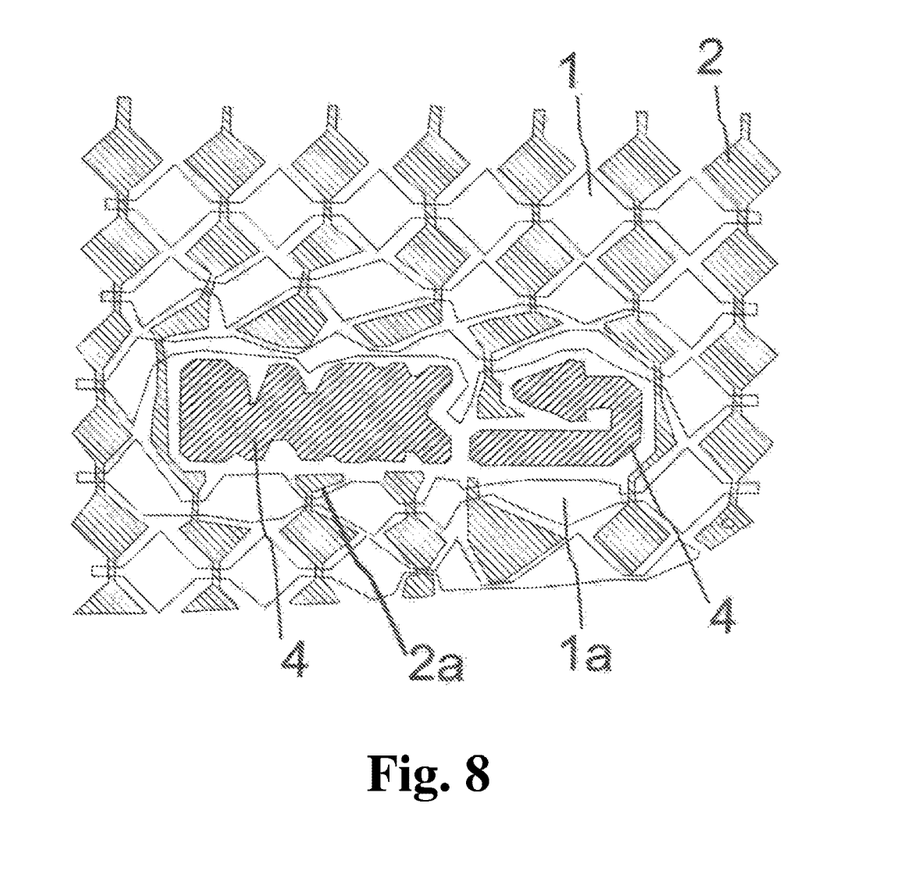
FIG. 8 shows a schematic detailed view of an assembly according to the embodiment shown in FIG. 5 in the vicinity of a larger through-hole.

FIG. 8 shows a schematic detailed view of an assembly with a partially non-rule-compliant rhombic surface configuration of the first type 1 and second type 2 in the vicinity of a through-hole 4. The through-holes 4 shown here have a maximum clearance and correspond to a combination of letters forming the word "Back" and a bent arrow. The respective through-hole 4 has approximately 1 times the size of the distance between the rows of the regular pattern, but about 5 times the size of the distance between the columns on the whole. Surfaces of the first 1b or of the second 2a type are provided adjacent to the through-hole 4, which, with respect to their type-related surface configuration, are configured in a non-rule-compliant manner, wherein the predefined minimum distance 3 from in each case at least two most closely adjacent surfaces (1a, 1a') of the other type is obtained. In the case of the through-hole 4 shown here, it is not possible to connect all of the receiving electrodes 14 by a non-rule-compliant surface configuration with the respective receiving electrodes 14 separated by the through-hole 4; therefore, the respective receiving electrodes 14 were electrically connected to each other by means of a shielded layer of the circuit board. Express reference is once again made to the fact that any possible deviations from the rule that the predefined minimum distance from, in each case, two most closely adjacent surfaces of the other type is obtained, result from inaccuracies in the drawings.

The present invention is not limited to embodiments described herein; reference should be had to the appended claims. It must thereby be noted that the features cited individually in the claims can be combined in any technologically meaningful manner and depict other embodiments of the present disclosure. The description, in particular in connection with the drawings, additionally characterizes and specifies the present disclosure.

What is claimed is:

1. A device for spatially resolving a projected capacitive touch detection, the device comprising:
   an electrically insulating substrate comprising a first type of electrically conductive surfaces, a second type of electrically conductive surfaces, and a through-hole, the first type of electrically conductive surfaces being electrically connected to each another in rows so as to form a plurality of transmitting electrodes, and the second type of electrically conductive surfaces being electrically connected to each other in columns so as to form a plurality of receiving electrodes,
   wherein,
   the first type of electrically conductive surfaces comprises non-deformed first type of electrically conductive surfaces having an outer circumference having a rectilinear profile and at least one deformed first type of electrically conductive surface having an outer circumference which has a stretched profile or a contracted profile compared to the outer circumference of the non-deformed first type of electrically conductive surfaces,
   the second type of electrically conductive surfaces comprises non-deformed second type of electrically conductive surfaces having an outer circumference having a rectilinear profile and at least one deformed second type of electrically conductive surface having an outer circumference which has a stretched profile or a contracted profile compared to the outer circumference of the non-deformed first type of electrically conductive surfaces,
   the first type of electrically conductive surfaces and the second type of electrically conductive surfaces are arranged in an alternating manner where a closest outer circumference of each of the first type of electrically conductive surfaces is always one of the second type of electrically conductive surfaces, and a closest outer circumference of each of the second type of electrically conductive surfaces is always one of the first type of electrically conductive surfaces, a minimum distance always existing between each of the first type of electrically conductive surfaces and each of the second type of electrically conductive surfaces, and at least one of the at least one deformed first type of electrically conductive surface and at least one of the at least one deformed second type of electrically conductive surface are respectively arranged to directly abut an outer circumference of the through-hole.

2. The device as recited in claim 1, wherein the arrangement of the first type of electrically conductive surfaces and the second type of electrically conductive surfaces in the alternating manner and the arrangement of the at least one of the at least one deformed first type of electrically conductive surface and the at least one of the at least one deformed second type of electrically conductive surfaces is provided to at least one of maintain a minimum distance, to maximize a common boundary surface, and to enlarge a charge-carrying surface.

3. The device as recited in claim 2, wherein the maximizing of the common boundary surface and/or the enlargement of the charge-charge-carrying surface at least one of increases a capacitance and compensates for a loss of the capacitance.

4. The device as recited in claim 1, wherein the outer circumference of the through-hole substantially corresponds to the outer circumference of a symbol.

5. The device as recited in claim 1, wherein the through-hole, in a direction orthogonal to an extending direction of the columns or rows, has a maximum clearance which is in the range of 0.2 to 2 times at least one of a distance between the columns and a distance between the rows of a regular pattern which is formed by the non-deformed first type of electrically conductive surfaces and by the non-deformed second type of electrically conductive surfaces.

6. The device as recited in claim 1, wherein a surface of all of the non-deformed first type of electrically conductive surfaces and a surface of all of the non-deformed second type of electrically conductive surfaces is greater than a surface of all of the at least one deformed first type of electrically conductive surface and of a surface of the at least one deformed second type of electrically conductive surface.

7. The device as recited in claim 1, wherein a geometric center point of the through-hole is disposed within at least one of a column defined by the regular pattern and a row defined by a regular pattern which is formed by the non-deformed first type of electrically conductive surfaces and by the non-deformed second type of electrically conductive surfaces.

8. The device as recited in claim 1, wherein the surfaces of the first type of electrically conductive surfaces and of the second type of electrically conductive surfaces are arranged in at least one of a coplanar manner on the electrically insulating substrate, on different sides of the electrically insulating substrate, and on different layers of the electrically insulating substrate.

9. The device as recited in claim 1, wherein the electrically insulating substrate is a circuit board.

10. The device as recite in claim 1, further comprising:
an electrical conductor arranged on an additional layer of the electrically insulating substrate, the electrical conductor being configured to bypass the through-hole and to electrically connect at least one of the at least one deformed first type of electrically conductive surface and the at least one deformed second type of electrically conductive surface to at least one further surface of at least one of the plurality of transmitting electrodes and the plurality of receiving electrodes.

11. The device as recited in claim 1, further comprising:
a surface structure that is arranged over the electrically insulating substrate, the surface structure defining an input surface which is translucent in an area adjacent to the through-hole; and
a lighting means for transmitting light through the through-hole arranged underneath the electrically insulating substrate.

12. The device as recited in claim 1, further comprising:
an electrical evaluation unit which is electrically connected to the plurality of transmitting electrodes.

13. The device as recited in claim 12, wherein the electrical evaluation unit is configured to detect a touch via the plurality of transmitting electrodes and the plurality of receiving electrodes using a mutual capacitance configuration.

14. The device as recited in claim 12, wherein,
the first type of electrically conductive surfaces and the second type of electrically conductive surfaces intersect with each other in an intersecting area,
at least one of the first type of electrically conductive surfaces and the second type of electrically conductive surfaces in the intersecting area is deformed as the at least one deformed first type of electrically conductive surface or as at least one deformed second type of electrically conductive surface, as the case might be, and,
the electrical evaluation unit is configured to amplify a measured signal between one of the plurality of receiving electrodes and one of the plurality of transmitting electrodes via a predefined gain factor.

15. The device as recited to claim 1, wherein the device is connected to a motor vehicle.

* * * * *